Dec. 3, 1929.  H. GEISEN  1,737,791
ELECTRIC POWER GENERATING SYSTEM
Filed Feb. 17, 1926
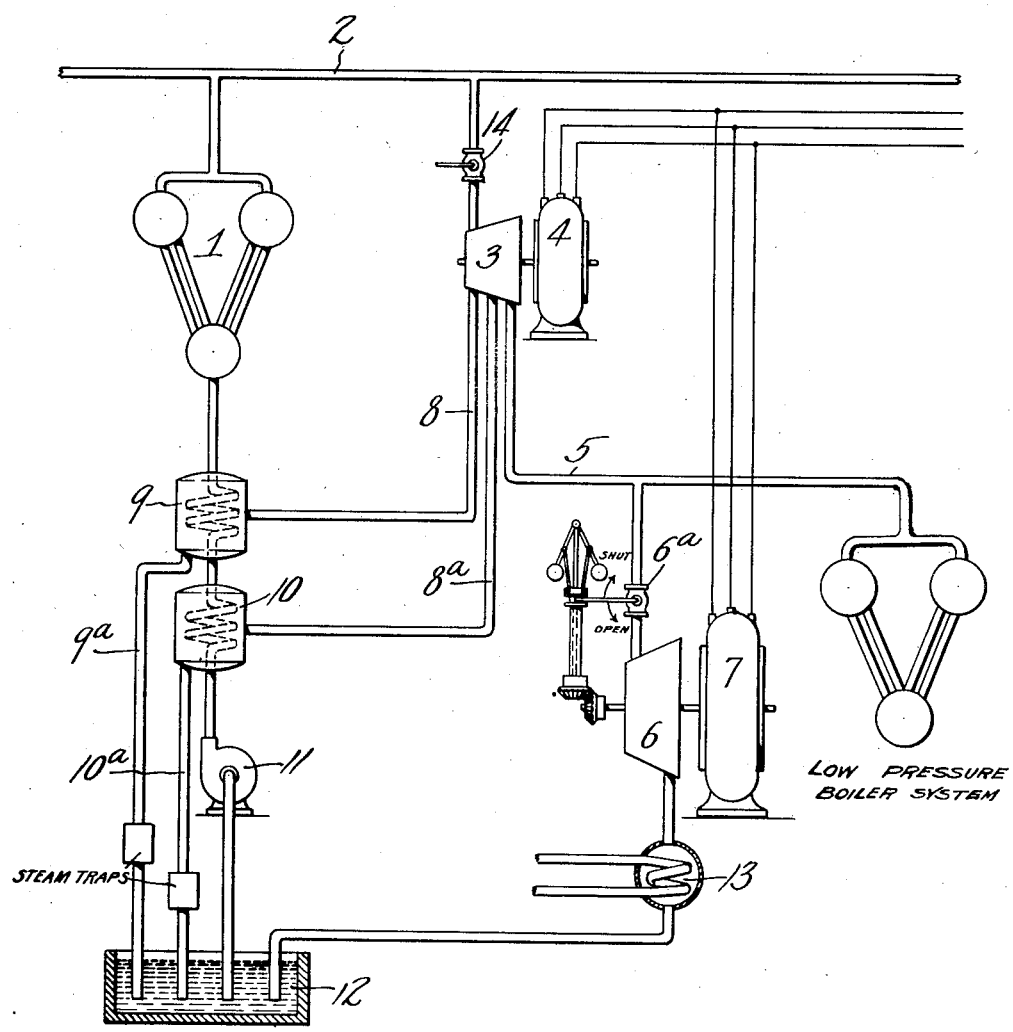
WITNESS
INVENTOR
Hans Geisen
BY
his ATTORNEYS Patented Dec. 3, 1929

1,737,791

UNITED STATES PATENT OFFICE

HANS GEISEN, OF BERLIN-CHARLOTTENBURG, GERMANY, ASSIGNOR TO SIEMENS-SCHUCKERTWERKE GESELLSCHAFT MIT BESCHRÄNKTER HAFTUNG, OF SIEMENS-STADT, NEAR BERLIN, GERMANY, A CORPORATION OF GERMANY

ELECTRIC POWER-GENERATING SYSTEM

Application filed February 17, 1926, Serial No. 88,800, and in Germany February 17, 1925.

My invention refers to electric power generating systems and has the purpose to improve the output of the power plant by improving the power factor of the electric generating system.

In equipping electric power stations the choice of prime movers and electric generators is limited to certain types. Frequently it is impossible to obtain the output demanded by a single set of machines so that it is necessary to distribute the total output over two or more sets. In order to attain a good distribution also from the steam engineering point of view a part of the steam power is supplied by high pressure prime movers connected in series with main prime movers. The correct distribution of the output over series and main machine may then be attained by correspondingly fixing the intermediate steam pressure. The distribution of the output then takes place according to the kind of series turbine used, the electro-generator driven by the series machine having the same size as the main electric generator or being smaller.

In most cases one is, however, not independent from the intermediate pressure. In particular this is the case if in existing plants comparatively old turbines with low initial pressures are at the disposal, ahead of which high-pressure machines are to be connected. If the intermediate pressure is too low, the new series prime movers become large and heavy. It is, therefore, desirable not to keep the intermediate pressure below a certain value. The choice of the intermediate pressure is thus no longer entirely arbitrary. In order to keep the series prime mover small, it is desirable to run it with the highest possible speed, i. e. with 3,000 revolutions per minute. It is then, however, impossible to go beyond certain sizes of electric generators. The conditions are thus as follows: If an electric network with a low power factor exists, the output of the electric generator decreases not only with the power factor, but also absolutely. From a generator of 37,000 kva. and at a power factor of 0.7 it will under certain circumstances be possible to obtain only 20,000 to 22,000 kw. In order to generate the necessary output, it would be necessary to install a considerably larger turbine or care must be taken that the power factor is improved by a wattless output generator.

My invention relates to the last mentioned method of improving the output. By allowing the electric generator driven by the series prime mover to run with a low power factor but assigning to it the function of covering of the wattless output, the output of the main turbine may be increased to such an extent that the installation of a particularly large prime mover is no longer necessary. The economy of the entire plant is increased according to my invention by interconnecting the steam supply for the prime movers which drive the electric generators.

According to my invention this is effected by driving the electric generator covering the wattless output by a prime mover connected in series with the main prime mover. The series machine fed from a high-pressure steam generator operates as a so-called "back pressure" machine, supplying its exhaust steam, or steam taken from intermediate stages, into a pipe line carrying steam of medium pressure, and by which the main prime mover is supplied.

An embodiment of my invention is diagrammatically illustrated in the acompanying drawing.

Referring to this drawing it will be seen that the high-pressure boiler 1 feeds through service main 2 the series turbine 3, which is coupled with the electric generator 4. This turbine 3 discharges its exhaust into a service main 5 from which the main turbine 6 is fed, which drives the generator 7.

The power factor of the generator 7 coupled with the main turbine 6 is improved by the partial or entire covering of its wattless output by the generator 4, in such a manner that either the total effective output of both machines is increased or a more favorable distribution of the wattless output is attained. In order to utilize the excess steam from turbine 3 in case of low load, one or several intermediate stages of this turbine may be tapped as shown by pipes 8 and 8ª each of which leads to a steam feed water heater 9 respectively 10. These feed water heaters are connected in series with each other in so far as the feed water delivered by pump 11 from the hot well 12 first enters and passes through heater 10 and thence through heater 9 before it is delivered into boiler 1. The condensate produced in the two heaters 9 and 10 is drained through pipes 9ª and 10ª respectively by way of steam traps into the hot well 12. The exhaust steam from main prime mover 6 is condensed in condenser 13 which likewise drains into hot well 12.

The low pressure service main 5 is not only connected to one of the stages of prime mover 3 but may also be connected to any number of boilers, indicated on the drawing by the legend Low pressure boiler system, sufficient to deliver the major amount of low pressure steam for operating the main prime mover 6.

Various modifications and changes may be made without departing from the spirit and the scope of the invention, and I desire, therefore, that only such limitations shall be placed thereon as are imposed by the prior art.

I claim as my invention:—

1. The method of operating an electric generating system embodying high pressure boilers, a high pressure turbine receiving steam from said boilers, said high pressure turbine having at least one intermediate stage and an exhaust, feed water heaters connected with said stage, a main steam line connected with said exhaust, a low pressure turbine connected with said main steam line, and interconnected alternating current generators driven by said turbines respectively; which comprises adjusting the generator driven by said high pressure turbine to deliver current at such a power factor that the generator driven by said low pressure turbine may operate at unity power factor, maintaining substantially constant the supply of steam to the high pressure turbine, controlling the steam supply to the low pressure turbine in accordance with the load on the low pressure turbine, and diverting steam from said intermediate stage of the high pressure turbine to the feed water heaters.

2. The method of operating an electric generating system embodying high pressure boilers, a high pressure turbine receiving steam from said boilers, said high pressure turbine having at least one intermediate stage and an exhaust, feed water heaters connected with said stage, a main steam line connected with said exhaust, a low pressure source of steam feeding said main steam line, a low pressure turbine connected with said main steam line, and interconnected alternating current generators driven by said turbines respectively; which comprises adjusting the generator driven by said high pressure turbine to deliver current at such a power factor that the generator driven by said low pressure turbine may operate at unity power factor, maintaining substantially constant the supply of steam to the high pressure turbine, controlling the steam supply to the low pressure turbine in accordance with the load on the low pressure turbine, and diverting steam from the intermediate stage of the high pressure turbine to the feed water heaters.

In testimony whereof I affix my signature.

HANS GEISEN.